US012622418B2

(12) United States Patent
Cote

(10) Patent No.: US 12,622,418 B2
(45) Date of Patent: May 12, 2026

(54) BIRD FEEDER HAVING INTERCONNECTED SEED TRAY

(71) Applicant: Paul L. Cote, Knowlton (CA)

(72) Inventor: Paul L. Cote, Knowlton (CA)

( * ) Notice: Subject to any disclaimer, the term of this patent is extended or adjusted under 35 U.S.C. 154(b) by 0 days.

(21) Appl. No.: 19/048,387

(22) Filed: Feb. 7, 2025

(65) Prior Publication Data

US 2025/0255280 A1      Aug. 14, 2025

Related U.S. Application Data

(60) Provisional application No. 63/552,396, filed on Feb. 12, 2024.

(51) Int. Cl.
*A01K 39/014* (2006.01)
*A01K 39/012* (2006.01)

(52) U.S. Cl.
CPC .......... *A01K 39/014* (2013.01); *A01K 39/012* (2013.01)

(58) Field of Classification Search
CPC ............................ A01K 39/014; A01K 39/012
USPC ................................................... 119/62, 57.8
See application file for complete search history.

(56) References Cited

U.S. PATENT DOCUMENTS

| | | | | | |
|---|---|---|---|---|---|
| 2,841,116 | A | * | 7/1958 | Nichols ................ | A01K 39/012 119/53 |
| 3,244,150 | A | * | 4/1966 | Benton ................ | A01K 39/012 119/52.2 |
| 5,235,935 | A | * | 8/1993 | Edwards .............. | A01K 39/012 119/52.3 |
| 5,452,682 | A | * | 9/1995 | Bescherer ........... | A01K 39/012 119/57.8 |
| 8,985,052 | B1 | * | 3/2015 | Lush .................... | A01K 39/012 119/51.01 |
| 2003/0150391 | A1 | * | 8/2003 | Rich .................... | A01K 39/012 119/57.8 |
| 2005/0011463 | A1 | * | 1/2005 | Nock ................... | A01K 39/012 119/52.2 |
| 2005/0211177 | A1 | * | 9/2005 | Bescherer ........... | A01K 39/012 119/57.8 |
| 2006/0107900 | A1 | * | 5/2006 | Bescherer ........... | A01K 39/012 119/57.8 |
| 2008/0290243 | A1 | * | 11/2008 | Bonnema ............. | A01K 39/012 248/533 |
| 2009/0188432 | A1 | * | 7/2009 | McMullen ........... | A01K 39/012 119/57.8 |
| 2010/0258055 | A1 | * | 10/2010 | Cote ................... | A01K 39/0113 119/52.3 |
| 2014/0360435 | A1 | * | 12/2014 | Cote ................... | A01K 39/0106 119/57.8 |
| 2015/0027377 | A1 | * | 1/2015 | Donegan ............. | A01K 39/012 119/51.01 |
| 2015/0305311 | A1 | * | 10/2015 | Murray ................ | A01K 39/012 119/51.01 |
| 2015/0366168 | A1 | * | 12/2015 | Cote ................... | A01K 39/012 29/434 |
| 2016/0262357 | A1 | * | 9/2016 | Cole ................... | A01K 39/014 |
| 2019/0269105 | A1 | * | 9/2019 | Cote ................... | A01K 39/012 |

(Continued)

*Primary Examiner* — Zoe Tam Tran
(74) *Attorney, Agent, or Firm* — Andrews Robichaud PC; Alessandro Colonnier

(57) ABSTRACT

The present disclosure provides a bird feeder having a seed container, seed tray, cover and funnel to direct seeds onto the seed tray. The seed tray and funnel and engaged about a connection point, the connection point positioned below the base of the seed tray to improve the seed flow.

9 Claims, 5 Drawing Sheets

(56)            References Cited

U.S. PATENT DOCUMENTS

| | | | |
|---|---|---|---|
| 2019/0313608 A1* | 10/2019 | Cote | A01K 39/012 |
| 2020/0077626 A1* | 3/2020 | Cote | A01K 39/0113 |
| 2021/0185989 A1* | 6/2021 | Cote | A01K 39/012 |
| 2022/0256816 A1* | 8/2022 | Woods | A01K 39/012 |
| 2022/0304282 A1* | 9/2022 | Cote | A01K 39/012 |

* cited by examiner

270

275

115

BIRD FEEDER HAVING INTERCONNECTED SEED TRAY

CROSS REFERENCE TO RELATED APPLICATION

The present application claims priority to U.S. Provisional Application No. 63/552,396, entitled "BIRD FEEDER HAVING INTERCONNECTED SEED TRAY" filed on Feb. 12, 2024, the contents of which are incorporated herein by reference in their entirety.

FIELD

The disclosure relates generally to the field of bird feeders, and more specifically to a bird feeder having interconnected seed tray and funnel.

BACKGROUND

Bird feeders have been around for quite some time for bird watchers and animal lovers. However, many problems exist with current bird feeders, including but not limited to poor seed flow from the seed container to the seed tray.

As such, there is a need for a novel type of bird feeder that can overcome the problems of the prior art.

SUMMARY

In an aspect, the present disclosure provides a bird feeder comprising: a seed container to contain seeds; a seed tray connected to the seed container and adapted to provide access to the seeds; a funnel attached to the seed container and releasably secured to the seed tray at a connection point, the funnel to distribute the seeds onto the seed tray; and, a shroud engaged with the seed tray, the shroud moveable between a first position to provide access to the seeds and a second position to deny access to the seeds.

In another aspect, the present disclosure provides a bird feeder comprising: a seed container to contain seeds; a seed tray connected to the seed container and adapted to provide access to the seeds; a shroud engaged with the seed tray, the shroud moveable between a first position to provide access to the seeds and a second position to deny access to the seeds; and, an upper ring surrounding an upper end of the seed container, the upper ring having a funnel-shape inner wall to reduce seed loss in the bird feeder.

BRIEF DESCRIPTION OF THE DRAWINGS

The following figures serve to illustrate various embodiments of features of the disclosure. These figures are illustrative and are not intended to be limiting.

DETAILED DESCRIPTION

Figure 1:
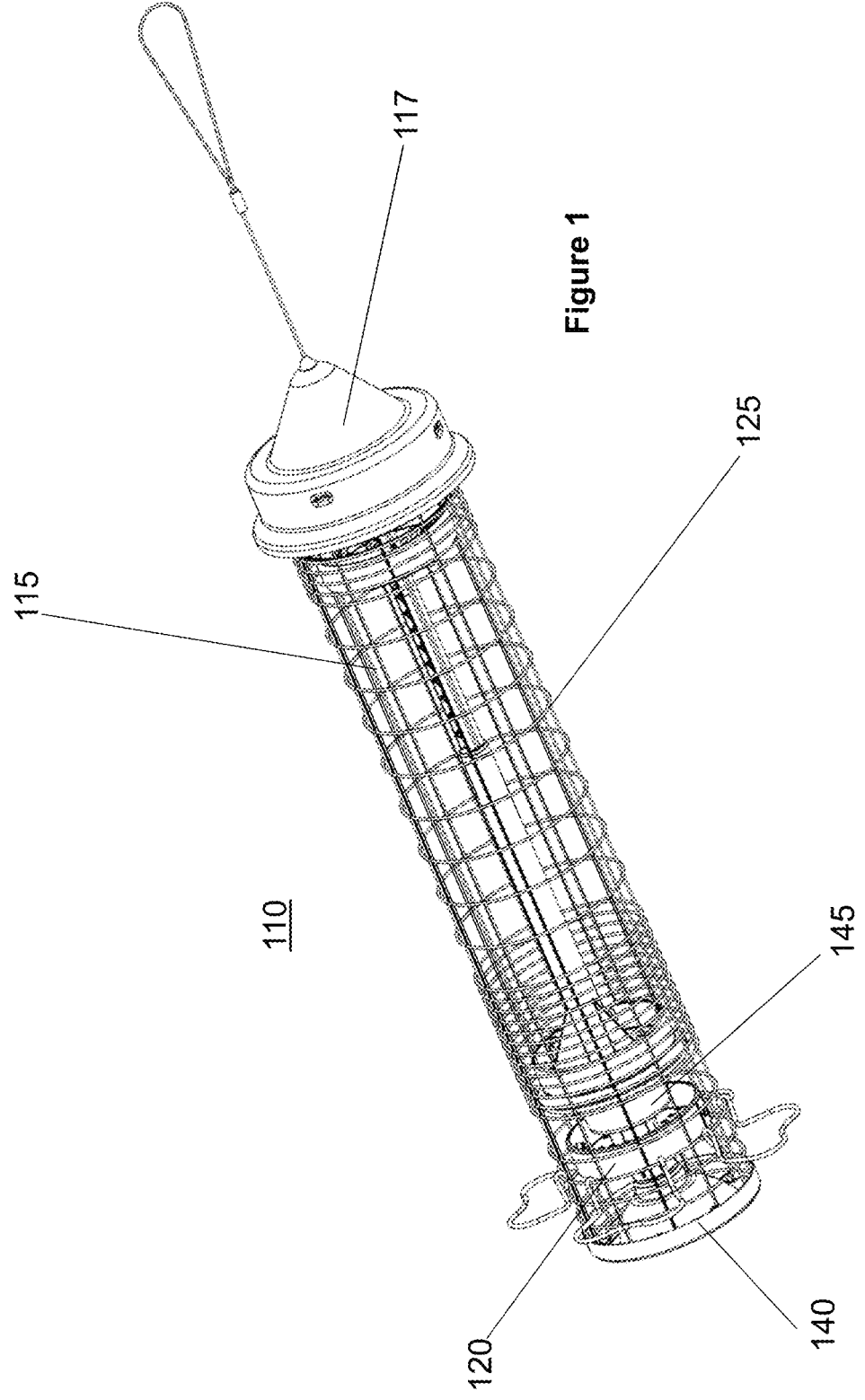
FIG. 1 is a perspective view of another bird feeder, according to another embodiment of the present disclosure.
Figure 2:
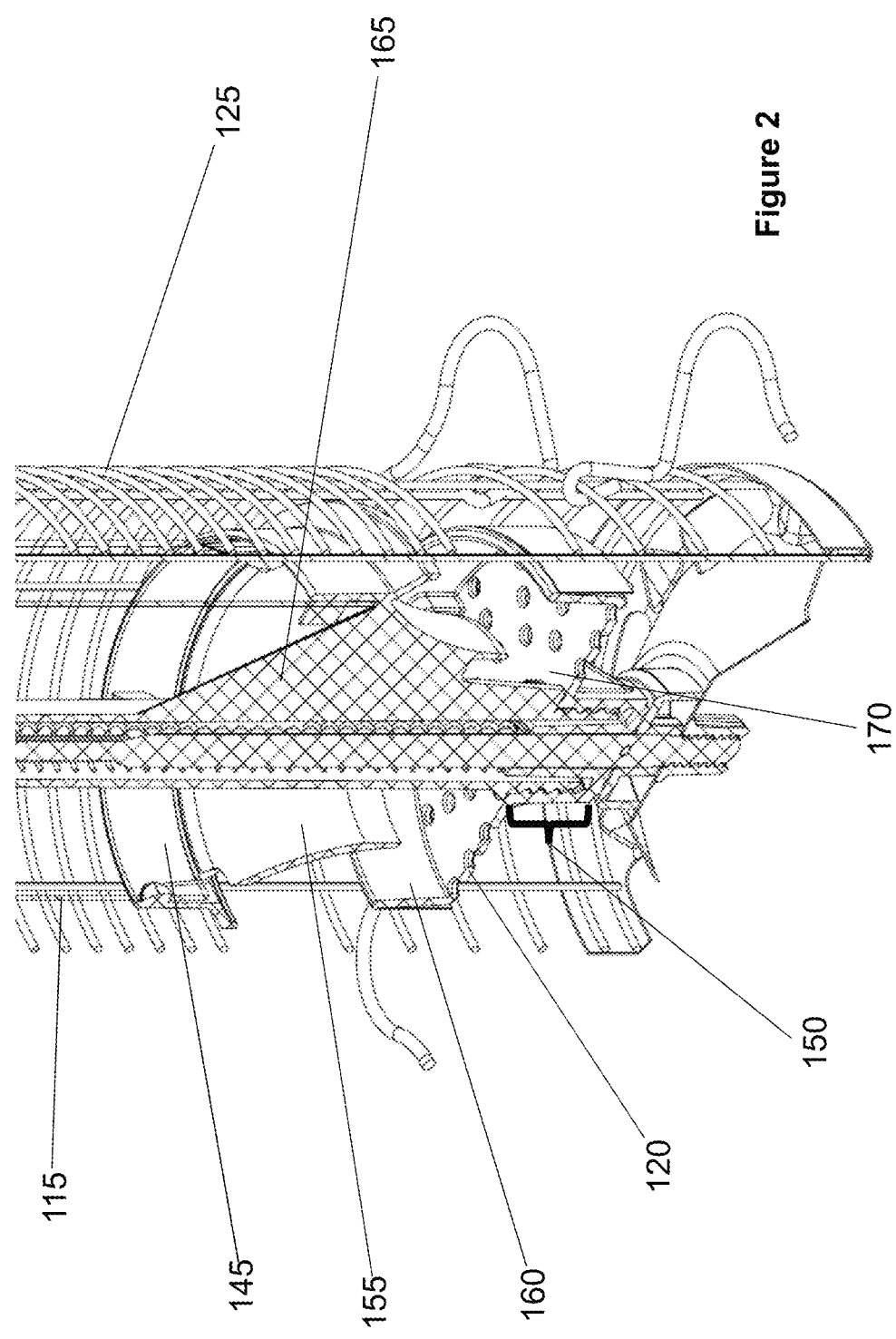
FIG. 2 is an enlarged perspective cross-sectional view of a seed tray connected to a funnel at a connection point of the bird feeder of FIG. 1, according to another embodiment of the present disclosure.

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

With reference to FIGS. 1, 2, 3 and 4 and according to an embodiment of the present disclosure, another bird feeder 110 is shown, preferably comprising a seed container 115 to contain seeds and capped by a cover 117, a seed tray 120 connected to the seed container 115 and adapted to hold and provide access to the seeds and a shroud 125, the shroud 125 moveable from a first position, where access to the seeds is permitted, to a second position, where access to the seeds is denied. The bird feeder 110 is also comprised of a base 140 and a funnel 145 attached to the seed container 115 and releasably secured to the seed tray 120 at a connection point 150. A function of the funnel 145 is to distribute the seeds onto the seed tray 120. The funnel 145 has an inward-sloping inner wall 155 whose diameter is smaller than the diameter of the outer walls 160 of the seed tray 120 to facilitate optimal flow of seeds. The funnel 145 also has a few longitudinal dividers 165 to further facilitate optimal flow of seeds. As shown, the connection point 150 is positioned below the seed tray 120 to improve a flow of the seeds from the seed container to the seed tray. Indeed, in conventional bird feeders, the connection point 150 is positioned above the base 170 of the seed tray 120. However, the engagement means of the connection point 150, in this case the threaded engagement, takes up additional volume and impedes the seed flow from the funnel 145 to the seed tray 120. Having the connection point 150 below the seed tray 120 removes this limitation.

Figure 3:
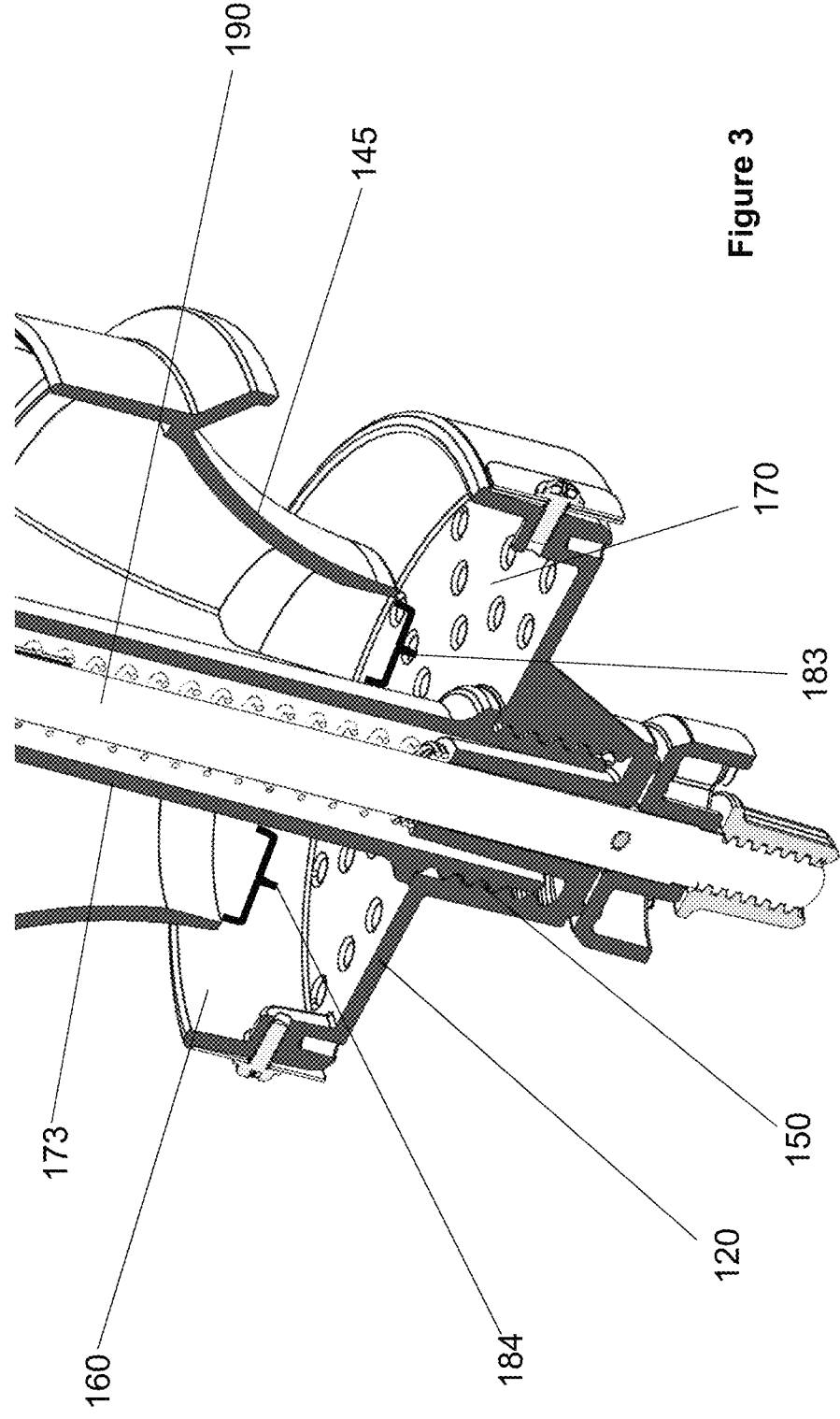
FIG. 3 is another enlarged perspective cross-sectional view of a seed tray connected to a funnel at a connection point of the bird feeder of FIG. 1, according to another embodiment of the present disclosure.

With specific reference to FIG. 3, having the connection point 150 positioned below the base 170 of the seed tray 120 allows for a greater area in between the funnel 145 and the tubular wall 173 surrounding the rod 190, as denoted by sections 183, 184. Indeed, it is desirable to maximize the size of this area to improve the seed flow from the seed container (not shown) and the seed tray 120. In the prior art (not shown), when a connection point was above the base of the seed tray, a bulge was created around the tubular wall that impeded the seed flow. This larger bulge was present as the interconnecting threads between the funnel and seed tray took up space near the tubular wall. As such, this improved connection point 150 has been shown to be advantageous over the prior art by eliminating this bulge.

Figure 4:
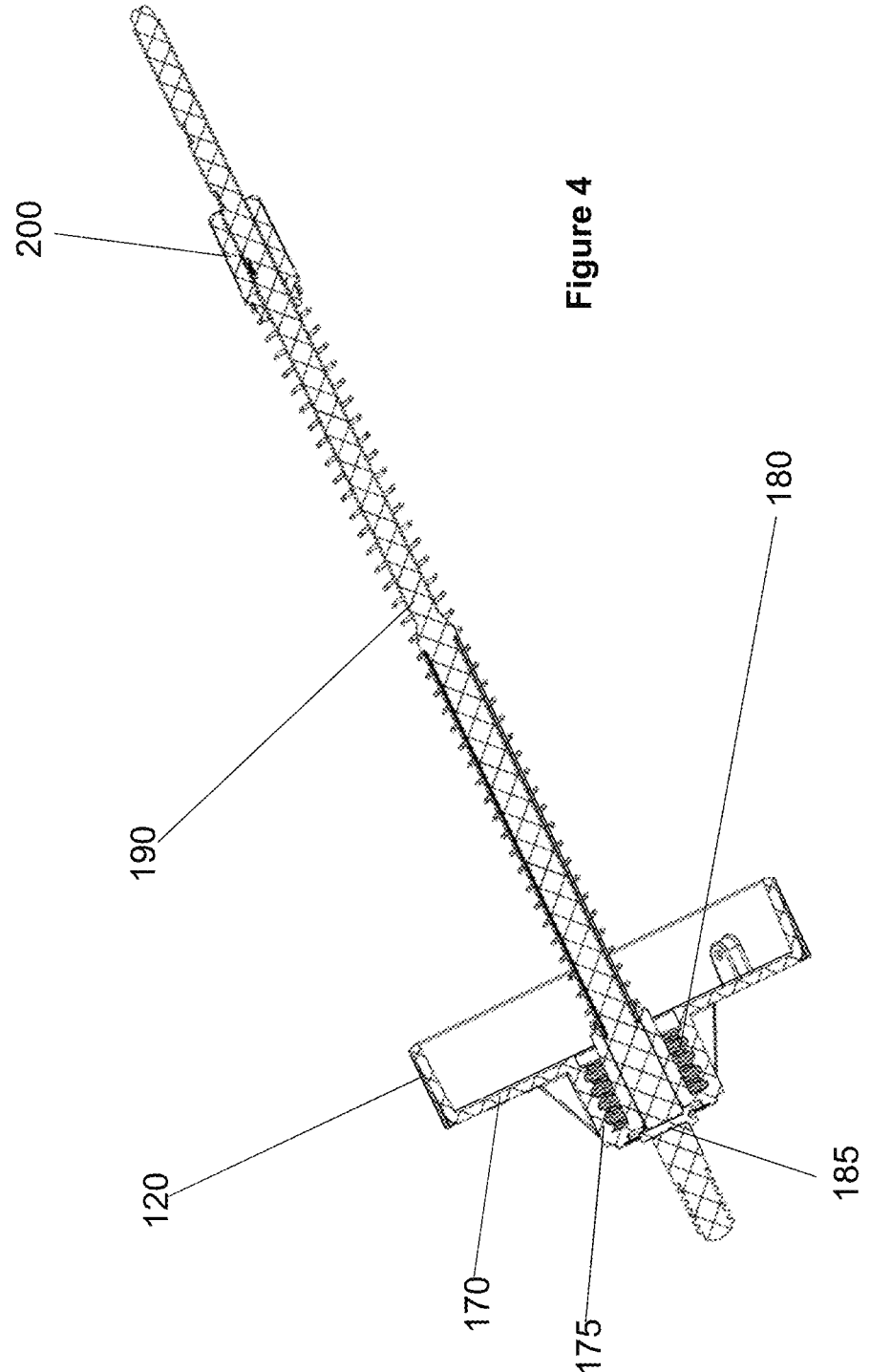
FIG. 4 is a perspective cross-sectional view of the seed tray positioned on a rod of the bird feeder of FIG. 1 in a first extended position, according to another embodiment of the present disclosure; and, FIG. 5 is an enlarged perspective view of an upper end of the seed container of the bird feeder of FIG. 1, according to another embodiment of the present disclosure.

With specific reference to FIG. 4, the seed tray 120 has a base 170 and a recess 175 projecting downwardly from the base 170, the recess 175 having threads 180 thereon to threadedly engage the funnel (not shown). A pin 185 is also shown, the pin 185 secured through the rod 190 to retain the seed tray 120 in place. Indeed, a spring 195 surrounds the rod 190 and is compressed in between the seed tray 120 and an upper nut 200 to bias the seed tray 120 downwardly. The pin 185 can be positioned in, or screwed into, the rod 190 to hold the seed tray 120 in place relative to the rod 190.

Figure 5:
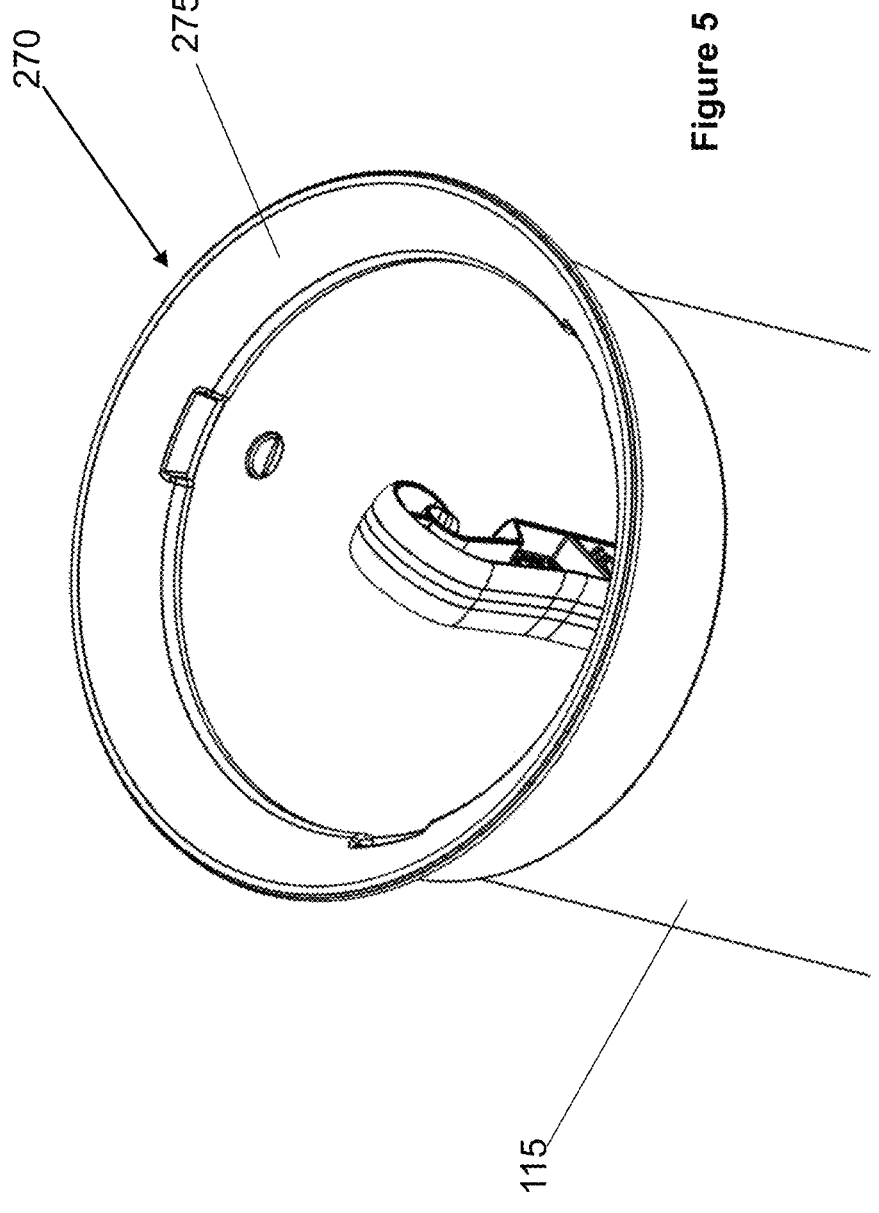

With reference to FIG. 5 and according to an embodiment of the present disclosure, the bird feeder is also comprised of an upper ring 270 surrounding the upper portion of the seed container 115. As shown, the upper ring 270 has funnel-shaped inner wall 275. A purpose of the funnel shape of the inner wall 275 is to guide the seeds that are dropped into the bird feeder into the seed container 115. Indeed, providing a slope to the inner wall 275 facilitates seed flow and reduced the loss of seeds that would otherwise fall out of the seed container 115 if not properly deposited therein.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. A bird feeder comprising:
   a seed container to contain seeds;
   a seed tray connected to the seed container and adapted to provide access to the seeds, the seed tray having a base to receive the seeds;
   a rod extending from below the seed tray to an upper end of the seed container;
   a funnel attached to the seed container and releasably secured to the seed tray at a connection point, the funnel to distribute the seeds onto the seed tray; and,
   a shroud engaged with the seed tray, the shroud moveable between a first position to provide access to the seeds and a second position to deny access to the seeds,
   wherein the connection point is positioned below the base of the seed tray to improve a flow of the seeds from the seed container to the seed tray.

2. The bird feeder of claim 1 further comprising a recess projecting downwardly from the base, the recess having first threads thereon to threadedly engage the funnel.

3. The bird feeder of claim 2 wherein the funnel is further comprised of second threads to threadedly engage the first threads of the seed tray.

4. The bird feeder of claim 1 wherein the funnel has longitudinal dividers to further facilitate a flow of the seeds from the seed container to the seed tray.

5. The bird feeder of claim 1 further comprising an upper ring surrounding an upper end of the seed container, the upper ring having a funnel-shape inner wall to reduce seed loss in the bird feeder.

6. The bird feeder of claim 1 further comprising
   a pin secured through the rod to retain the seed tray in place.

7. The bird feeder of claim 6 further comprising a spring surrounding the rod, and wherein the spring is compressed in between the seed tray and an upper nut to bias the seed tray downwardly.

8. A bird feeder comprising:
   a seed container to contain seeds;
   a seed tray connected to the seed container and adapted to provide access to the seeds;
   a shroud engaged with the seed tray, the shroud moveable between a first position to provide access to the seeds and a second position to deny access to the seeds; and,
   an upper ring surrounding an upper end of the seed container, the upper ring having a funnel-shape inner wall to reduce seed loss in the bird feeder,
   wherein the funnel-shape inner wall forms a continuous, uninterrupted sloping surface around a circumference of the upper ring.

9. The bird feeder of claim 8 further comprising a cover releasably secured to the seed container.

\* \* \* \* \*